Nov. 18, 1952
F. J. HENDEL
2,618,586
PROCESS FOR DESULFURIZING PETROLEUM
PRODUCTS IN THE LIQUID PHASE
Filed Nov. 3, 1950
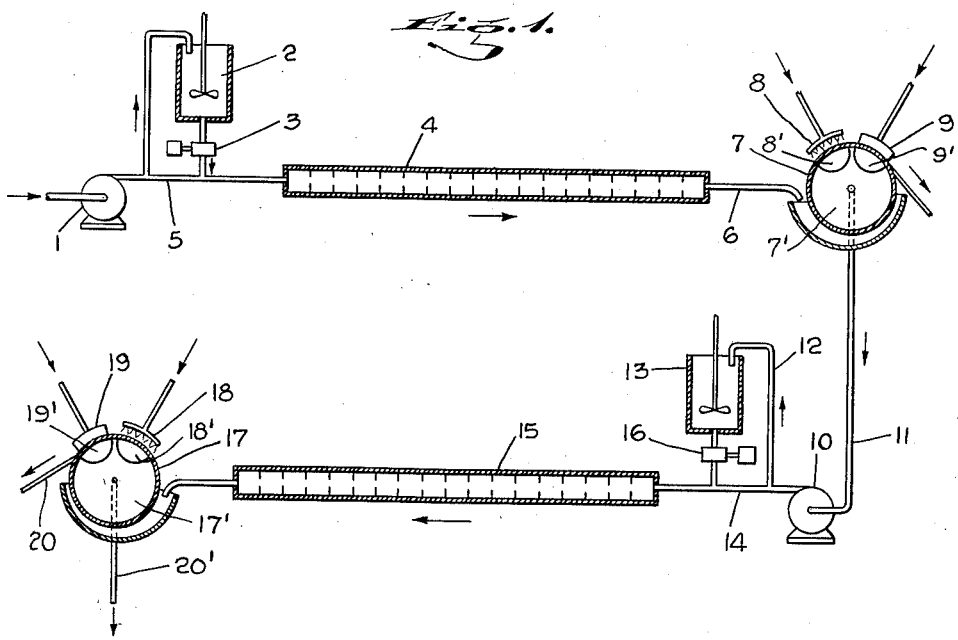
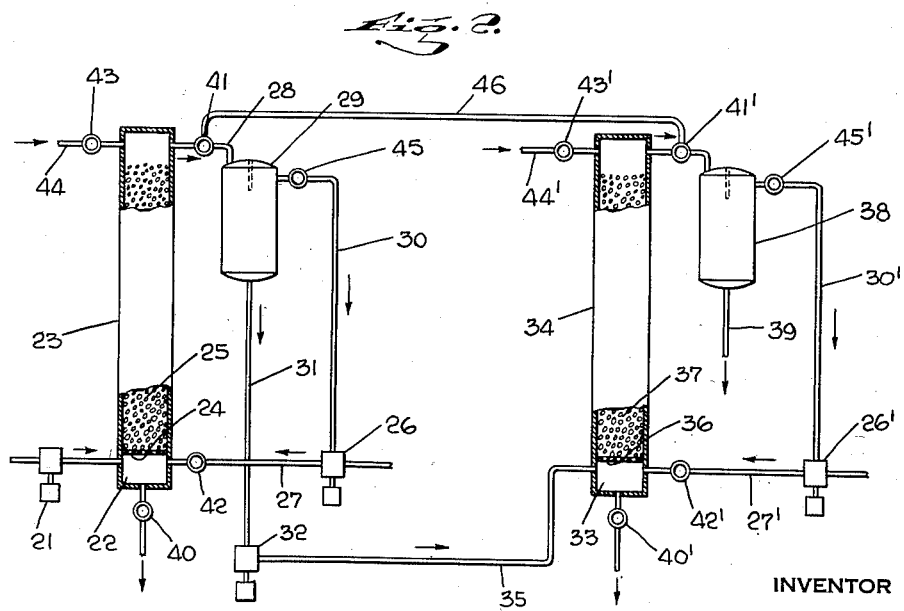
INVENTOR
Frank J. Hendel Patented Nov. 18, 1952

2,618,586

UNITED STATES PATENT OFFICE 2,618,586

PROCESS FOR DESULFURIZING PETROLEUM PRODUCTS IN THE LIQUID PHASE

Frank J. Hendel, Newark, N. J., assignor to Wigton-Abbott Corporation, Plainfield, N. J., a corporation of New Jersey Application November 3, 1950, Serial No. 193,912

3 Claims. (Cl. 196—30)

This invention relates to desulfurizing of petroleum products and, particularly, to new and improved procedures for desulfurizing petroleum products by treating such products in the liquid phase and at low temperatures with agents which remove the sulfur containing compounds without substantial chemical change.

Various procedures are known for desulfurizing petroleum products by chemical reactions which break down the sulfur containing compounds and remove the sulfur either in the form of a gas, such as hydrogen sulfide, or in the form of an insoluble metal sulfide. While these procedures are reasonably effective in removing the sulfur, they are generally costly and cumbersome to carry out commercially. Furthermore, the hydrocarbon residues left after chemical removal of the sulfur from the sulfur containing compounds remain in the petroleum product and, in some instances, the presence of these residues is objectionable.

I have now discovered that the desulfurizing of petroleum products can be carried out in an efficient and practical way, while avoiding the disadvantages inherent in chemical desulfurization above mentioned, by treatment of petroleum products in the liquid phase and at low temperatures with materials which adsorb the sulfur containing compounds. My new process actually comprises two adsorption steps which will be referred to as a primary adsorption step and a secondary adsorption or decolorization step, and which can be carried out in an efficient and practical way in either continuous or semi-continuous or batchwise operation of the process as more fully hereinafter described.

In the primary adsorption step, a liquid petroleum product having a bad odor due to the presence of sulfur containing compounds is brought into intimate and extended contact with a body of a heavy metal oxide having an affinity for the sulfur containing compounds, said metal oxide being in the form of a fine powder, porous pellets or other particles, such as oxide coated particles of an inert carrier, to provide a large adsorbent surface. The adsorption is carried out at a temperature within the range of about −20° to 200° F. and below the temperature at which the particular liquid being treated will react chemically with the metal oxide to form a metal sulfide. In general, light petroleum fractions, such as naphtha, gasoline and kerosene are treated at about room temperature or below, whereas heavier fractions and sulfur containing crudes are treated at somewhat higher temperatures.

Various heavy metal oxides of the type previously employed in chemical or catalytic desulfurization procedures can be employed in my primary adsorption step, but those which have been found to be most satisfactory are the oxides of nickel, tungsten, molybdenum, manganese and lead, and mixtures thereof. It should be noted, in this connection, that the surprising adsorbent properties of the metal oxides in my process, in contrast to the chemical reaction to form metal sulfides in prior desulfurization procedures, is apparently due to the low temperature which I employ.

The sulfur bearing petroleum liquid can be contacted with the metal oxide in various ways, the important thing being to provide a contact or retention period sufficiently long to permit the sulfur containing compounds to be adsorbed on the metal oxide. In general, a minimum contact time of from two to five minutes for light petroleum fractions to about ten to fifteen minutes for heavy fractions and crudes will be adequate, but it will be understood that the optimum contact time will vary considerably depending on the viscosity of the petroleum liquid, the amount of mixing or agitation that is provided and the nature and amount of sulfur compounds to be removed.

The amount of metal oxide to employ also varies with different petroleum liquids depending upon the particular metal oxide employed and the nature and amount of sulfur containing compounds to be removed. For most purposes, however, about one part by (metric) weight of metal oxide to five parts by (metric) volume of petroleum liquid, i. e., one kilogram to five liters, will produce satisfactory results.

In treating small amounts of petroleum liquid, a mixture of the petroleum liquid and metal oxide can be placed in a suitable vessel, thoroughly agitated for the required contact period, and then filtered to separate the metal oxide and adsorbed sulfur compounds from the desulfurized petroleum liquid. When treating large amounts of petroleum liquid on a commercial scale, the desulfurization is more efficiently carried out continuously by passing both the petroleum liquid and the adsorbent through a suitable mixer, such as the orifice mixer hereinafter described, or semi-continuously by passing the petroleum liquid through a stationary body or column of adsorbent.

Although the continuous and semi-continuous adsorption procedures can be used interchangeably, the continuous adsorption is particularly suited for the treatment of viscous and/or high sulfur containing petroleum liquids while the semi-continuous adsorption is particularly suited for the treatment of low viscosity and/or low sulfur containing liquids.

In any of the contact or adsorption procedures above mentioned, a small amount of the adsorbent is dissolved or suspended in the petroleum liquid imparting a dark color to the liquid even in instances where the starting liquid was substantially water-white. A portion of the sulfur containing compounds, generally not more than about 10% of the amount present in the initial liquid is adsorbed or agglomerated around the suspended particles of adsorbent forming big colloidal aggregates or micelles. Although these micelles are relatively stable, they will, upon standing for several days, break down to precipitate the metal oxide and liberate part of the bound sulfur compounds. It is, therefore, advisable to follow the primary adsorption step promptly with a secondary adsorption or decolorization step.

The decolorization step can be carried out, either batchwise, continuously, or semi-continuously as previously described for the primary adsorption step using as adsorbent a decolorizing agent, such as bentonite clay, diatomaceous earth, fuller's earth, aluminia, or even an excess of the heavy metal oxide used in the primary adsorption step. Thorough mixing is also essential in the decolorizing step although the contact time is generally shorter than in the primary adsorption step.

If desired, the primary adsorption step and decolorization step can be carried out concurrently by employing as adsorbent a mixture of a heavy metal oxide and a decolorizing agent, or as above mentioned, by employing an excess of the heavy metal oxide.

Both the metal oxide used in the primary adsorption and the bentonite clay or other adsorbent used in the decolorization can readily be regenerated by washing with water at a temperature not exceeding 100° C. and then blowing with steam. The water merely removes the petroleum liquid which remains in the body of adsorbent while the steam treatment removes the adsorbed sulfur compounds either by distilling them, or melting and washing them away.

It is preferable when steam blowing the metal oxide to simultaneously feed some air or oxygen to prevent the adsorbed sulfur compounds from reacting with the metal oxide to form the metal sulfide. With this simple precaution, however, the metal oxide can be regenerated and reused in the process more or less indefinitely.

The simple regeneration of the bentonite clay or other decolorizing agent leaves behind the metal oxide, and when the amount of metal oxide after a number of regenerations begins to impair the efficiency of the adsorbent, the metal oxide can be removed by washing the adsorbent with dilute acid. With the periodic acid treatments, the bentonite clay or other adsorbent can be reused indefinitely.

The following example will serve to demonstrate how my new adsorption process for the desulfurization of petroleum liquids is carried out, but it is to be understood that this example is given by way of illustration and not by way of limitation.

*Example*

A heavy sulfur free naphtha with a boiling range 150°–195° C. was contaminated with amyl mercaptan and 2.67% of thiofene. Hence, the sulfur content by weight was:

| | Percent by weight |
|---|---|
| Mercaptan S | 1.39 |
| Thiofene S | 1.00 |
| Total | 2.39 |

50 cc. of that liquid was shaken vigorously for ten minutes with 10 grams of black nickel oxide that was in the form of a fine powder. After filtering the liquid was of a dark color but the odor was sweet. The sulfur content dropped to 0.36% by lamp method. Hence, the sulfur reduction was 85%.

By shaking this filtrate with 7 grams of bentonite clay and filtering it again a water-white product was achieved. The sulfur content was further reduced; the product did not lose either its water-white color or the sweet odor even after standing for a long period.

The procedures involved and apparatus employed in commercial application of my invention will best be understood from a consideration of the accompanying drawing, in which various parts of the apparatus are designated by suitable reference characters in each of the views, and in which:

Fig. 1 is a schematic view, diagrammatically illustrating procedures and apparatus for the continuous operation of my process, and Fig. 2 is a view similar to Fig. 1, but showing procedures and apparatus for the semi-continuous operation of my process.

In Fig. 1 of the drawing, I have diagrammatically illustrated an apparatus for the continuous desulfurization of petroleum liquids such, for example, as high sulfur Santa Fe Springs crude oil. The starting crude oil is fed to the system by the pump 1, a portion being by-passed to an agitator mixer 2, where it is mixed with powdered nickel oxide, and the resulting sludge is fed by pump 3 to an orifice mixer 4. The major portion of the crude oil feed passes directly to the orifice mixer through the pipe 5. The primary adsorption step takes place within the orifice mixed 4 and the mixture of oil and nickel oxide-sulfur compound adsorbate leaving the orifice mixer is carried by the pipe 6 to a drum filter 7 having a main collecting chamber 7' which separates the desulfurized oil from the adsorbate. As the drum rotates, the saturated adsorbent is carried beneath a water spray 8 and the washings are withdrawn through a second collecting chamber 8'. Further rotation of the drum carries the saturated adsorbent past a steam discharge 9 and a third collecting chamber 9' where the adsorbed sulfur compounds are removed to regenerate the nickel oxide; the regenerated oxide being scraped from the drum in the usual way and collected for reuse in the process. In the operation of the drum filter, the separate filtrations can be effected either by applying pressure externally of the drum, or by applying a vacuum to the chambers 7', 8' and/or 9'.

The desulfurized oil is drawn from the main collecting chamber 7' by the pump 10 through the pipe 11 and fed to a decolorizing system generally similar to the primary adsorption system above described. The pump 10 feeds a portion of the oil through pipe 12 to an agitator mixer 13, where it is combined with an adsorbent such as bentonite clay, and the remainder of the oil passes through the pipe 14 directly to an orifice mixer 15. The pump 16 feeds the oil-adsorbent sludge to the orifice mixer 15 where it is thoroughly mixed with the main portion of the desulfurized oil and the resulting mixture is discharged to a drum filter 17, similar to the filter 7. The decolorized oil is drawn into the main vacuum chamber 17' and the clay is then regenerated as it passes between water sprays 18 and vacuum chamber 18' and then between steam discharge 19 and vacuum chamber 19', the regenerated clay being scraped from the drum in the usual way, as indicated at 20. The desulfurized and decolorized oil is discharged from the main vacuum chamber 17' through the pipe 20'.

It will be understood that, in the apparatus above described, the capacity in continuous operation depends upon the size, i. e., diameter and length, of the orifice mixers and the retention time that is required to remove sulfur compounds from a particular starting material. The optimum retention time can be attained by appropriate regulation of the rates at which the starting oil, heavy metal oxide, and decolorizing agent are fed through the apparatus.

In Fig. 2 of the drawing, a modified form of desulfurizing apparatus is shown which is adapted for the semi-continuous or columnwise treatment of sulfur bearing petroleum liquids. The petroleum liquid, such for example as kerosene, is fed by the pump 21 to a chamber 22 at the lower end of a column or tower 23. The chamber 22 is separated by a perforated wall 24 from the adsorption chamber 25, which is packed with particled adsorbent, such as porous pellets of nickel oxide.

In order to create good mixing of the kerosene around the surfaces of the nickel oxide, a refinery gas is delivered from a suitable source of supply from a compressor 26 through pipe 27 to the chamber 22. This gas bubbles through the liquid and the nickel oxide in tower 23 and, then together with the liquid, leaves the top of the tower through pipe 28 and passes into a separating vessel 29. In the vessel 29, the gas is separated from the liquid and this gas or lighter vapors is delivered back to the tower 23 by the pipe 30 which leads to the compressor 26. The liquid in the vessel 29 is pumped through pipe 31 by pump 32 and delivered to a chamber 33 in the bottom of another column or tower 34 through pipe 35. A perforated plate 36 separates the chamber 33 from an adsorption chamber 37 in the tower 34 and the adsorption chamber is packed with particles or pellets of an adsorbent, such as bentonite clay.

Here again, refinery gas from a source of supply, which may be common to the source supplying the compressor 26, is fed by compressor 26' to the chamber 33 through pipe 27'. The gas entering the chamber 33 bubbles up through the liquid and the pellets and around the pellets in the tower 37 and the liquid and gas are discharged into a separator 38, similar to the separator 29, the gas and vapors discharging from separator 38 through pipe 30'; whereas the desulfurized and decolorized product is discharged through pipe 39.

From the foregoing, it will be apparent that a single compressor can be utilized to supply gas to the towers 23 and 34 by simply joining the pipes 30 and 30' and the pipes 27 and 27' respectively.

In connection with the method as disclosed in Fig. 2, whenever the nickel oxide and the bentonite clay require regeneration, this can be cared for by providing the valve control drains 40, 40' and which control the discharges from chambers 22, 33 and employing valves 41 and 42 in pipes 28, 27 and corresponding valves 41', 42' controlling tower 34, and further employing valves 43, 43' which control pipes 44, 44' and, further, by incorporating valves 45, 45' in the pipes 30, 30' adjacent separators 29 and 38. The valves 41, 41' are preferably three-way valves to provide means for establishing direct communication from the top of tower 23 to the top of tower 34 through pipe 46. (For use in the water wash hereinafter described.)

In regenerating the columns, the feed of oil by the pump 21 is stopped, the valves 41, 42; 41', 42' are closed and the valves 40, 40' are opened to permit the oil to drain from the two towers. The valve 40 is then closed, valves 41, 41' are adjusted to permit passage of fluid through the pipe 46 and water is pumped through the system by the pump 21, displaced oil and wash water passing out through the valve 40' at the bottom of the tower 34. When the oil has been completely displaced, the pump 21 is stopped, the valves 41, 41' are again closed and valve 40 is then opened. After the water has drained from the towers 33 and 34, the valves 43, 43' are opened to permit the charging of steam to the columns through the pipes 44, 44'. The steam removes the sulfur containing compounds from the adsorbents and carries them from the towers through the discharge valves 40, 40'. Air or oxygen is preferably admitted with the steam to prevent any reaction of the sulfur compounds with the heavy metal adsorbent, particularly in column 23. When all of the sulfur containing compounds have been removed by the steam treatment, the columns of adsorbent material are ready for use in the desulfurization of additional petroleum liquid.

The semi-continuous desulfurizing treatment, as shown in Fig. 2 of the drawing, is particularly suitable for use in treating petroleum liquids which have a relatively small amount of sulfur containing material to be removed. With material of this type, the adsorption process can continue for a relatively long period of time before the columns of adsorbent become saturated and desulfurizing efficiency begins to fall off. Even in instances where regeneration would have to be carried out quite frequently, the ease of regeneration with an apparatus, such as that shown in Fig. 2, reduces to a minimum the time and expense of the regeneration step. The apparatus set up of the type and kind shown in Fig. 1 has the advantage, of course, of effecting regeneration of the adsorbent continuously as it is separated from the treated petroleum liquid on the drum filter. This type of apparatus, therefore, provides a true continuous desulfurizing operation.

Modifications in the foregoing procedures will occur to those skilled in the art and to the extent that such modifications are embraced in the following claims, it is to be understood that they constitute part of my invention.

I claim:

1. The process for removing sulfur containing compounds from a petroleum liquid, that comprises contacting the petroleum liquid with an adsorbent material selected from the class consisting of oxides of nickel, tungsten, molybdenum and manganese, and mixtures thereof, at a temperature within the range of about −20° to 200° F. and below the temperature at which the liquid being treated will react with the metal oxide to form a metal sulfide, and separating the metal oxide and adsorbed sulfur compounds from the desulfurized petroleum liquid.

2. The process for removing sulfur containing compounds from a petroleum liquid, that comprises intimately contacting a sulfur bearing petroleum liquid with an adsorbent material, comprising a substance selected from the class consisting of oxides of nickel, tungsten, molybdenum, and manganese, and mixtures thereof, by passing the petroleum liquid through a column packed with particled adsorbent material, recovering the effluent stream of desulfurized petroleum liquid, continuing the flow of sulfur bearing petroleum liquid through the column of adsorbent until the adsorbent is substantially saturated with sulfur compounds, then temporarily discontinuing the feed of sulfur bearing petroleum liquid and regenerating the adsorbent by washing with water at a temperature below 100° C. to remove residual petroleum liquid, and then treating with steam to remove the adsorbed sulfur compounds.

3. The process as defined in claim 2, wherein the intimate contacting of petroleum liquid and adsorbent in the column is facilitated by continuously feeding to the column a stream of refinery gas.

FRANK J. HENDEL.

REFERENCES CITED

The following references are of record in the file of this patent:

UNITED STATES PATENTS

| Number | Name | Date |
|---|---|---|
| 378,246 | Frasch | Feb. 21, 1888 |
| 451,724 | Gordon | May 5, 1891 |
| 607,017 | Colin | July 12, 1898 |
| 1,759,730 | Black et al. | May 20, 1930 |
| 1,938,116 | Smith | Dec. 5, 1933 |
| 2,064,999 | Watson | Dec. 22, 1936 |
| 2,088,497 | Tijmstra | July 27, 1937 |
| 2,090,190 | Dolbear | Aug. 17, 1937 |
| 2,168,142 | Schutte | Aug. 1, 1939 |
| 2,348,623 | Hewlett et al. | May 9, 1944 |
| 2,369,558 | Gilbert | Feb. 13, 1945 |
| 2,487,795 | Evans | Nov. 15, 1949 |
| 2,509,486 | Danforth | May 30, 1950 |
| 2,547,629 | Engel et al. | Apr. 3, 1951 |
| 2,574,445 | Porter et al. | Nov. 6, 1951 |